(12) United States Patent
Boney

(10) Patent No.: US 8,726,991 B2
(45) Date of Patent: *May 20, 2014

(54) CIRCULATED DEGRADABLE MATERIAL ASSISTED DIVERSION

(75) Inventor: Curtis Boney, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 1077 days.

This patent is subject to a terminal disclaimer.

(21) Appl. No.: 12/035,099

(22) Filed: Feb. 21, 2008

(65) Prior Publication Data

US 2008/0210423 A1 Sep. 4, 2008

Related U.S. Application Data

(60) Provisional application No. 60/892,630, filed on Mar. 2, 2007.

(51) Int. Cl.
*E21B 33/13* (2006.01)
*E21B 43/16* (2006.01)

(52) U.S. Cl.
USPC .................. 166/281; 166/305.1; 166/285

(58) Field of Classification Search
None
See application file for complete search history.

(56) References Cited

U.S. PATENT DOCUMENTS

| | | | |
|---|---|---|---|
| 4,444,264 A * | 4/1984 | Dill .............................. | 166/294 |
| 5,311,936 A | 5/1994 | McNair et al. | |
| 5,318,121 A | 6/1994 | Brockman et al. | |
| 5,318,122 A | 6/1994 | Murray et al. | |
| 5,322,127 A | 6/1994 | McNair et al. | |
| 5,325,924 A | 7/1994 | Bangert et al. | |
| 5,353,876 A | 10/1994 | Curington et al. | |
| 5,388,648 A | 2/1995 | Jordan, Jr. | |
| 5,520,252 A | 5/1996 | McNair | |
| 5,810,088 A | 9/1998 | Lamirand et al. | |
| 5,929,437 A | 7/1999 | Elliott et al. | |
| 5,975,205 A | 11/1999 | Carisella | |
| 6,367,548 B1 * | 4/2002 | Purvis et al. .................. | 166/281 |
| 6,561,269 B1 | 5/2003 | Brown et al. | |
| 6,575,247 B2 | 6/2003 | Tolman et al. | |
| 6,604,582 B2 | 8/2003 | Flowers et al. | |
| 6,810,954 B2 | 11/2004 | Garrett et al. | |
| 6,837,309 B2 | 1/2005 | Boney et al. | |
| 6,876,959 B1 | 4/2005 | Peirce et al. | |
| 6,910,537 B2 | 6/2005 | Brown et al. | |
| 6,915,845 B2 | 7/2005 | Leising et al. | |
| 6,957,701 B2 | 10/2005 | Tolman et al. | |
| 7,055,604 B2 | 6/2006 | Jee et al. | |
| 7,059,407 B2 | 6/2006 | Tolman et al. | |
| 7,159,661 B2 | 1/2007 | Restarick et al. | |

(Continued)

FOREIGN PATENT DOCUMENTS

WO 2006059056 A1 6/2006

*Primary Examiner* — Angela M DiTrani
(74) *Attorney, Agent, or Firm* — Jeremy D. Tillman; Rachel Greene; Tim Curington

(57) ABSTRACT

Methods are circulated degradable material assisted diversion (CMAD) for well treatment in completed wells. A slurry of solid degradable material is circulated in the well with return of excess slurry, a plug of the degradable material is formed, a downhole operation is performed around the plug diverter, and the plug is then degraded for removal. Degradation triggers can be temperature or chemical reactants, with optional accelerators or retarders to provide the desired timing for plug removal. In multilayer formation CMAD fracturing, the plug isolates a completed fracture while additional layers are sequentially fractured and plugged, and then the plugs are removed for flowback from the fractured layers.

22 Claims, 8 Drawing Sheets

(56) References Cited

U.S. PATENT DOCUMENTS

| | | |
|---|---|---|
| 7,166,560 B2 | 1/2007 | Still et al. |
| 7,267,170 B2 * | 9/2007 | Mang et al. .................. 166/279 |
| 7,275,596 B2 | 10/2007 | Willberg et al. |
| 7,380,600 B2 * | 6/2008 | Willberg et al. ........... 166/280.1 |
| 7,565,929 B2 * | 7/2009 | Bustos et al. ................. 166/279 |
| 2004/0009880 A1 | 1/2004 | Fu |
| 2005/0279494 A1 | 12/2005 | Sachdeva et al. |
| 2006/0042797 A1 | 3/2006 | Fredd et al. |
| 2006/0102349 A1 | 5/2006 | Brady et al. |
| 2006/0113077 A1 | 6/2006 | Willberg et al. |

* cited by examiner

CIRCULATED DEGRADABLE MATERIAL ASSISTED DIVERSION

CROSS REFERENCE TO RELATED APPLICATION

This application claims the benefit of and priority to U.S. provisional application Ser. No. 60/892,630, filed Mar. 2, 2007.

BACKGROUND OF THE INVENTION

The statements in this section merely provide background information related to the present disclosure and may not constitute prior art.

This invention relates generally to the field of treating a subterranean formation to increase the production of hydrocarbon from a formation. More specifically, the invention provides a method using a treatment fluid and diversion agent.

Hydraulic fracturing involves injecting fluids into a subterranean formation at pressures sufficient to form fractures in the formation, and the resulting fractures increase flow of production fluids from the formation to the wellbore. In chemical stimulation, flow capacity is improved by using chemicals to alter formation properties, such as increasing effective permeability by dissolving materials in or etching the subterranean formation. A wellbore may be an open hole or a cased hole where a metal pipe called a casing is placed into the drilled hole and often cemented in place or isolated with devices that expand to seal between the casing and wellbore. In a cased wellbore, the casing is perforated in specified locations to allow hydrocarbon flow into the wellbore or to permit treatment fluids to flow from the wellbore to the formation.

To access hydrocarbon effectively and efficiently, it is desirable to direct the treatment fluid to target zones of interest in a subterranean formation. There may be target zones of interest within various subterranean formations or multiple layers within a particular formation that are preferred for treatment. In such situations, it is preferred to treat the target zones or multiple layers without inefficiently treating zones or layers that are not of interest, e.g. nonproducing zones or zones with high water and/or gas content. In general, treatment fluid flows along the path of least resistance. For example, in a large formation having multiple zones, a treatment fluid would tend to dissipate in the portions of the formation that have the lowest pressure gradient or portions of the formation that require the least force to initiate a fracture. Similarly in horizontal wells, and particularly horizontal wells having long laterals, the treatment fluid dissipates in the portions of the formation requiring lower forces to initiate a fracture, often near the heel of the lateral section, and less treatment fluid is provided to other portions of the lateral. Once treatment of a zone or formation is completed it is desirable to treat another zone. Also, it is desirable to avoid stimulating undesirable zones, such as water-bearing or non-hydrocarbon bearing zones. Thus it is helpful to use methods to divert the treatment fluid to target zones of interest or away from undesirable zones.

Diversion methods are known to facilitate treatment of a specific interval or intervals. Ball sealers are mechanical devices that frequently are used to seal perforations in some zones thereby diverting treatment fluids to other perforations. In theory, use of ball sealers to seal perforations permits treatment to proceed zone by zone depending on relative breakdown pressures or permeability. But frequently ball sealers prematurely seat on one or more of the open perforations, resulting in two or more zones being treated simultaneously. Likewise, when perforated zones are in close proximity, ball sealers have been found to be ineffective. In addition, ball sealers are useful only when the casing is cemented in place. Without cement between the casing and the borehole wall, the treatment fluid can flow through a perforation without a ball sealer and travel in the annulus behind the casing to any formation. Ball sealers have limited use in horizontal wells owing to the effects of formation pressure, pump pressure, and gravity in horizontal sections, as well as the possibility that laterals in horizontal wells may not be cemented in place.

Other mechanical devices used for diversion include bridge plugs, packers, down-hole valves, sliding sleeves, and baffle/plug combinations; and particulate placement. As a group, use of such mechanical devices for diversion tends to be time consuming and expensive, making them operationally unattractive, particularly in situations where there are many target zones of interest.

Chemically formulated fluid systems are known for use in diversion methods and include viscous fluids, gels, foams, or other fluids. Many of the known chemically formulated diversion agents are permanent (not reversible) in nature and some may damage the formation. In addition, some chemical methods may lack the physical structure and durability to effectively divert fluids pumped at high pressure or they may undesirably affect formation properties. The term diversion agent herein refers to mechanical devices, chemical fluid systems, combinations thereof, and methods of use for blocking flow into or out of a particular zone or a given set of Degradable materials have been used for fluid loss control. Examples include rock salt, graded rock salt, benzoic acid flakes, wax beads, wax buttons, oil-soluble resin material, etc. Degradable materials have also been used to facilitate proppant transport, such as disclosed in U.S. Pat. No. 7,275,596. Commonly assigned U.S. Pat. No. 7,565,929 discloses degradable material assisted diversion methods and compositions.

A method of reliably treating target zones in a subterranean formation using a diversion agent without plugging or bridging the next zone or formation in the treating sequence would be desirable. A method in which producing zones in the same well bore could be treated serially using the same downhole equipment without intervening wireline operations would also be desirable. Ideally, such methods might facilitate an upper-to-lower zone treatment protocol or mixture of order based on best completion options in the appropriate circumstances, rather than the prevailing lower-to-upper protocol currently in use.

SUMMARY OF THE INVENTION

The present invention in various embodiments provides a method for treating a well with a circulated degradable material assisted diversion (CMAD), and a CMAD method for multilayer treatment or diversion, wherein a slurry of degradable material is circulated in the wellbore of a completed well to facilitate diversion procedures. In one embodiment, the method comprises the steps of: deploying a tubular string to a position at or below a target interval; treating the target interval; and circulating a plugging slurry past the target interval at a higher pressure than is in the formation and back up out of the well or on to another interval.

In an embodiment, the degradable material can form a temporary plug such that after a selected duration under the downhole conditions no additional intervention is needed to remove the plug. The temporary plug formation allows other well operations to be performed without damaging the existing fracture or producing formation, or without interference from the existing fracture or producing formation. Circulation of the slurry in the well bore facilitates placement of the degradable material diversion plug in one or more formations while avoiding bridging or plugging within the wellbore proper. Using this technique, the circulation can allow the plugging or treatment, especially fracturing in one embodiment, of multiple formations using the same tool or tubing insertion, i.e. without intermediate removal and replacement of the tubing and/or tool between plugging(s) and treatment(s).

As used herein, "circulated" or "circulating" means that the slurry flows along the well bore both toward a reference zone and away from the reference zone, either simultaneously or in separate steps in the same procedure, either in a separate conduit or annulus or by reversing the flow direction. Preferably the flow of the slurry is sufficiently continuous to inhibit solids settling or bridging within the borehole and confine plug formation to an adjacent formation, i.e. in the perforations or openings at a surface of the borehole leading into the formation.

In one embodiment, the method of well treatment can include: (a) injecting an aqueous or oil based slurry into a completed well bore penetrating a formation, wherein a solids phase of the slurry comprises an insoluble degradable material; (b) circulating the slurry through at least a portion of the well bore in contact with a surface comprising one or more openings in fluid communication with a first permeable formation; (c) consolidating the degradable material to form a plug of the degradable material in the one or more openings to block fluid communication between the well bore and the first permeable formation, wherein a flow of the slurry is maintained in the well bore during the circulation and consolidating steps to inhibit gravitational settling of the solids in the wellbore; (d) performing a downhole operation in the well while the degradable material assists diversion from the plugged first permeable formation, wherein the downhole operation can be hydraulic fracturing, acidizing, well repair, installation of downhole equipment, and combinations thereof, and (e) degrading the consolidated degradable material to remove the plug and restore fluid communication with the first permeable formation. The downhole operations can include slickwater fracturing and acid fracturing as further examples.

In an embodiment, the slurry circulation can include flow through a circulation loop comprising a tubular and an annulus between the tubular and the well bore, wherein the tubular has a fluid opening past the first permeable formation. The tubular can be pipe or tubing, for example. In an embodiment, the flow can be into the tubular at a location opposite the fluid opening, e.g. at the surface or another location above the first permeable formation, with flow out of the fluid opening past the formation surface where the plug is formed, to return though the annulus, e.g. to the surface or a second permeable formation. Alternatively, the flow can be down into the annulus, past the formation surface where the plug is formed, and through the fluid opening into the tubular for return. As the slurry flows past the formation surface, a portion enters or bleeds into the formation to screenout or otherwise deposit solids at the surface and eventually form the plug.

As used herein, the terms "above" and "up" and similar ones are used to encompass a relative location or flow in the wellbore toward the surface, whereas conversely "down" and "below" and similar terms are used to encompass a relative location flow or away from the surface, even though the wellbore may be formed laterally (i.e. a horizontal well) or even with an upward slope.

In an embodiment, the degradable material can be a polymer of monomer-derived units such as esters, aromatic acids, amides, and the like, and combinations thereof. In an embodiment, the degradable material can be polymers and copolymers of lactide and glycolide; polyethyleneterephthalate (PET); polybutyleneterephthalate (PBT); polyethylenenaphthalenate (PEN); partially hydrolyzed polyvinyl acetate; and derivatives thereof, and combinations and mixtures thereof, and the like. In one embodiment, the solids phase can include fiber. In one embodiment, the solids phase is essentially free of inert particles, i.e. materials which are not degradable so as to inhibit or prevent removal of the plug. In one embodiment the solids phase of the slurry contains less than 0.6 g/L (5 lbm/1,000 gal) inert particles such as proppant, for example.

In an embodiment, the degradable material and optionally other solids can be present in the slurry in a wide range of concentration, for example, from a lower volume fraction limit of solids in the slurry of 0.05 to a maximum upper limit of 0.56. Lower volume fractions can require excess liquid carrier and result in lost fluid to the formation. Higher volume fractions can cause bridging of the wellbore inside the annulus. The method can include inducing a screenout of the solids phase at the surface of the first permeable formation to consolidate the degradable material.

In one embodiment, the degradation can be triggered by a temperature change, and/or by chemical reaction between the degradable material and another reactant. Degradation can include dissolution of the degradable material.

In an embodiment of the method, a fluid phase of the slurry can include a viscoelastic surfactant (VES), a co-surfactant, a rheology modifier, a polymeric friction reducer, a surfactant friction reducer, a polymeric drag reduction enhancer, a monomeric drag reduction enhancer, an aqueous brine, viscous oil base (for example, the fluid phase can comprise an invert emulsion) or the like, or a combination or mixture thereof. In other embodiments of the invention, the slurry of degradable plug material is viscosified with and/or placed by a high viscosity polymer based fluid (such as a polysaccharide, such as guar or a guar derivative, linear or crosslinked); or a low viscosity polymer based fluid (for example a polyacrylamide); or a high viscosity surfactant based fluid (such as by example a VES based fluid system, or a VES plus a hydrophobically modified polymer, or a VES plus a rheology modifier); or a low viscosity polymer friction reducer based fluid, or a low viscosity surfactant based friction reducer fluid (such as by example a surfactant friction reducer plus a polymeric drag reduction enhancer, and/or a monomeric drag reduction enhancer) and combinations thereof. Hydrocarbons of sufficient viscosity, or those sufficiently thickened to suspend the degradable material using thickening materials common to the industry, can be used. VES containing systems are preferred.

In a particular embodiment, the present invention can provide a CMAD fracturing method that can include the steps of: (a) injecting well treatment fluid into a well penetrating a multilayer formation to propagate a hydraulic fracture in a layer of the formation; (b) circulating an aqueous slurry past the fracture, wherein the slurry comprises fibers of an insoluble, degradable material in a solids phase to form a plug of the consolidated fibers and isolate the hydraulic fracture from the wellbore, wherein the degradable material is present in the slurry at a concentration of at least 1.2 g/L (10 lbm/1, 000 gal), and wherein a fluid phase of the slurry comprises a viscoelastic surfactant, a co-surfactant, a rheology modifier, a polymer friction reducer, a surfactant friction reducer, a polymeric drag reduction enhancer, a monomeric drag reduction enhancer an aqueous brine, or a combination or mixture thereof, (c) with the plug diverting from the previous hydraulic fracture, injecting well treatment fluid into the well to propagate a subsequent hydraulic fracture in another layer of the formation; and (d) thereafter degrading the degradable material to remove the plug. The well treatment fluid in step (a) can include in various embodiments, a polymer friction reducer, or a low viscosity surfactant based friction reducer, a viscoelastic surfactant, a co-surfactant, a rheology modifier, an aqueous brine, or a combination or mixture thereof; preferably the fluid includes a friction reducing formulation.

In one embodiment, the CMAD fracturing method can also include sequentially repeating steps (b) and (c) one or a plurality of times for diversion from the previous hydraulic fractures and propagation of subsequent hydraulic fracture(s) in other layer(s), wherein the plugs are thereafter removed in step (d) by degrading the degradable material.

In an embodiment, a well treatment fluid passageway in the wellbore can be maintained open between the formation layers for the subsequent hydraulic fracturing, wherein the previous fracture is isolated from the wellbore by the plug, e.g. without using bridge or sand plugs or other isolation device in the wellbore. In a preferred embodiment, the well treatment fluid passageway is unrestricted by solids accumulation from the slurry. In an embodiment, the CMAD fracturing method can include perforation in advance of the fracture propagation in steps (a) and (c).

In an embodiment, the removal of the plug can be assisted by a wash. In one embodiment, any un-degraded material is produced with produced fluid without any need to assist in its removal.

DESCRIPTION OF THE INVENTION

Figure 1:
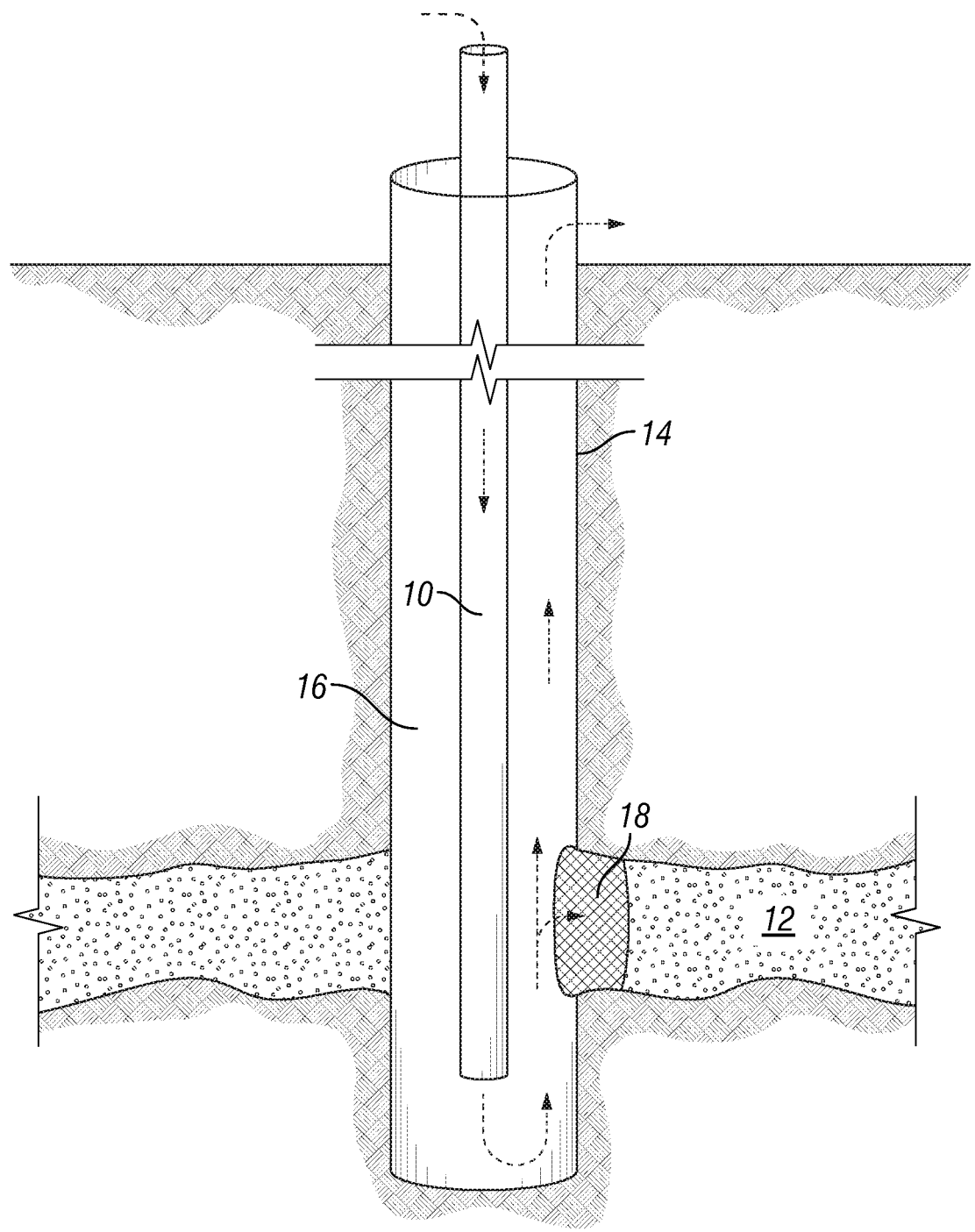
FIG. 1 schematically illustrates an embodiment of the present invention showing the tubular string below the target zone wherein the slurry flows down the tubing and up the annulus.

The present invention will be described in connection with its various embodiments. However, to the extent that the following description is specific to a particular embodiment or a particular use of the invention, this is intended to be illustrative only, and is not to be construed as limiting the scope of the invention. On the contrary, it is intended to cover all alternatives, modifications, and equivalents that are included within the spirit and scope of the invention, as defined by the appended claims.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Embodiments of the invention relate to methods for temporarily blocking wellbores, perforations, or formation fractures so that other work (e.g., fracturing of other zones, workover, well repair, installation of downhole equipment, etc.) can be performed more efficiently or without damaging existing fractures. The temporary blocking is achieved by consolidating solids including degradable materials that will degrade within a desired period of time. As applied in fracturing, the techniques of the invention in one embodiment can be similar to the induced stress diversion technique (ISDT) that is currently used for wells, such as those located, for example, on land in North America.

The present invention uses degradable particulates in a slurry to bridge either the wellbore or formation off to prevent the inflow of treatment fluids intended for a different interval or zone. In the past, pumping these types of slurries has been limited by the fact that the plugging slurry has not had enough volume to plug the interval. Further, an excess amount of the plugging slurry in the prior art methods has the concomitant requirement for a removal technique to prevent plugging of the next interval.

The method of the present invention comprises the steps of circulating the plugging slurry past the area to be plugged, e.g. in an annulus between the wellbore and the injection or return tubing, and back up out of the well or on to another zone. Past the interval to be plugged, only a portion of the plugging slurry will be allowed to proceed. This allows excess material to be used at the area to be plugged to insure diversion, while the circulation of the slurry permits removal of the slurry without settling or significant contact with non-diverted areas of the wellbore so that the diversion slurry will not be detrimental to the next interval.

In a well bore there is an interval that has open access to the formation and that formation has/can have fluids flowing through the access point, e.g. at perforations. Stopping or severely reducing the flow through the access point is often a primary objective so that fluids may stop flowing from the well bore or to another interval.

The method of the present invention utilizes in one embodiment an inner tubular string pointed pipe or coiled tubing) that is run at or below the interval to be diverted from as illustrated in FIG. 1. Once the inner tubular string 10 is at or below the selected interval 12 in the well bore 14, a diverting slurry is pumped down the inner tubing 10 and returned via the annulus 16 between the inner tubing and wellbore 14. The diverting slurry can in embodiments follow a fracture treatment, acidizing treatment, fluid injection or well circulation, whichever is more advantageous to the cost, timeliness, and reliability of the operation. As it contacts the interval 12, a diverting plug 18 is formed due to a higher pressure in the well bore 14 than in the interval 12 where there is fluid communication between the interval 12 and the well bore 14, and a subsequent treatment can be applied to another zone (not shown). The subsequent treatment can be the same or different than the treatment applied to interval 12, i.e. independently a fracture treatment, acidizing treatment, fluid injection or well circulation. In one preferred embodiment, the treatments of interval 12 and the subsequently treated interval comprise hydraulic fracturing.

Figure 2:
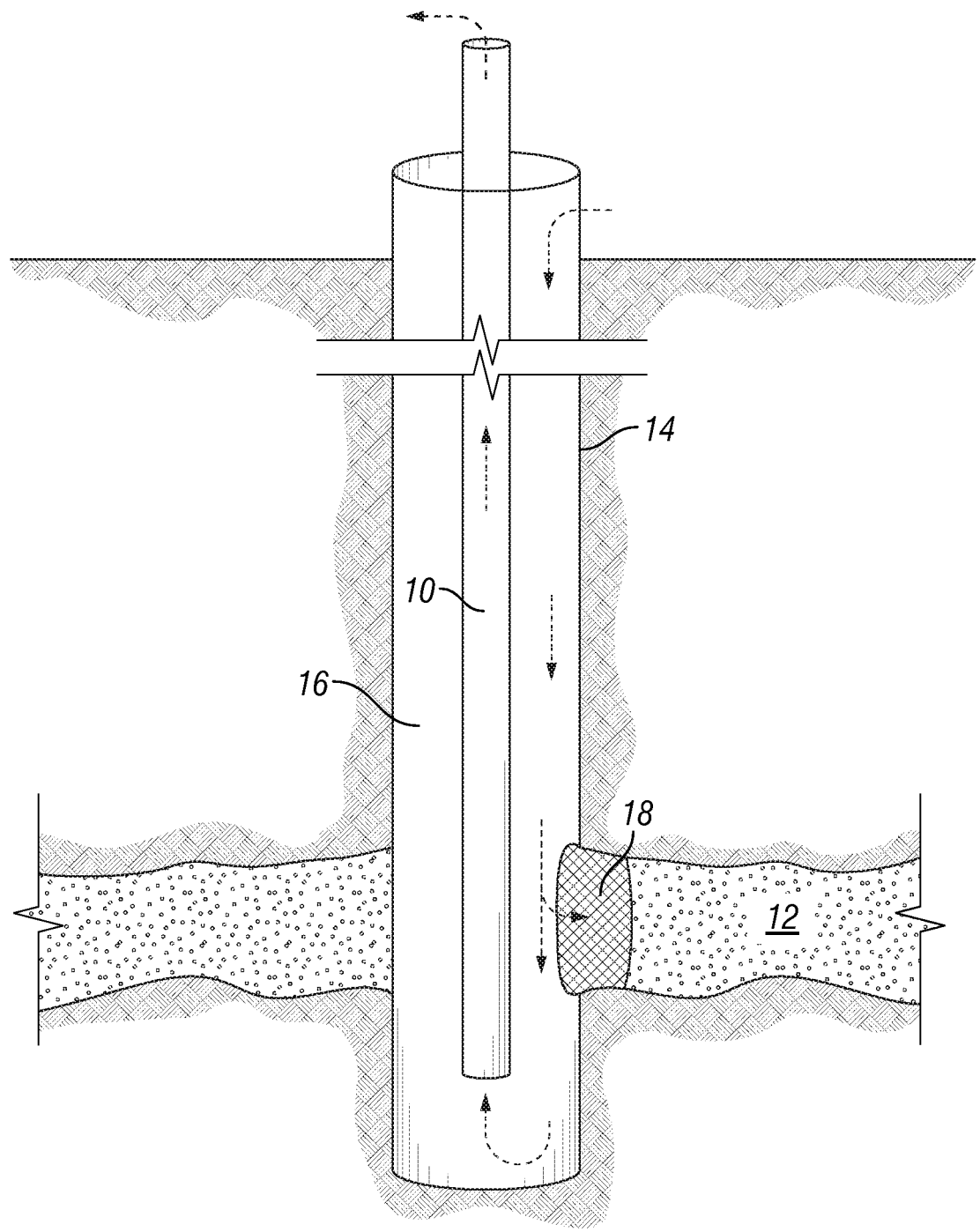
FIG. 2 schematically illustrates an embodiment of the present invention showing the tubular string below the target zone wherein the slurry flows down the annulus and up the tubing.
Figure 3:
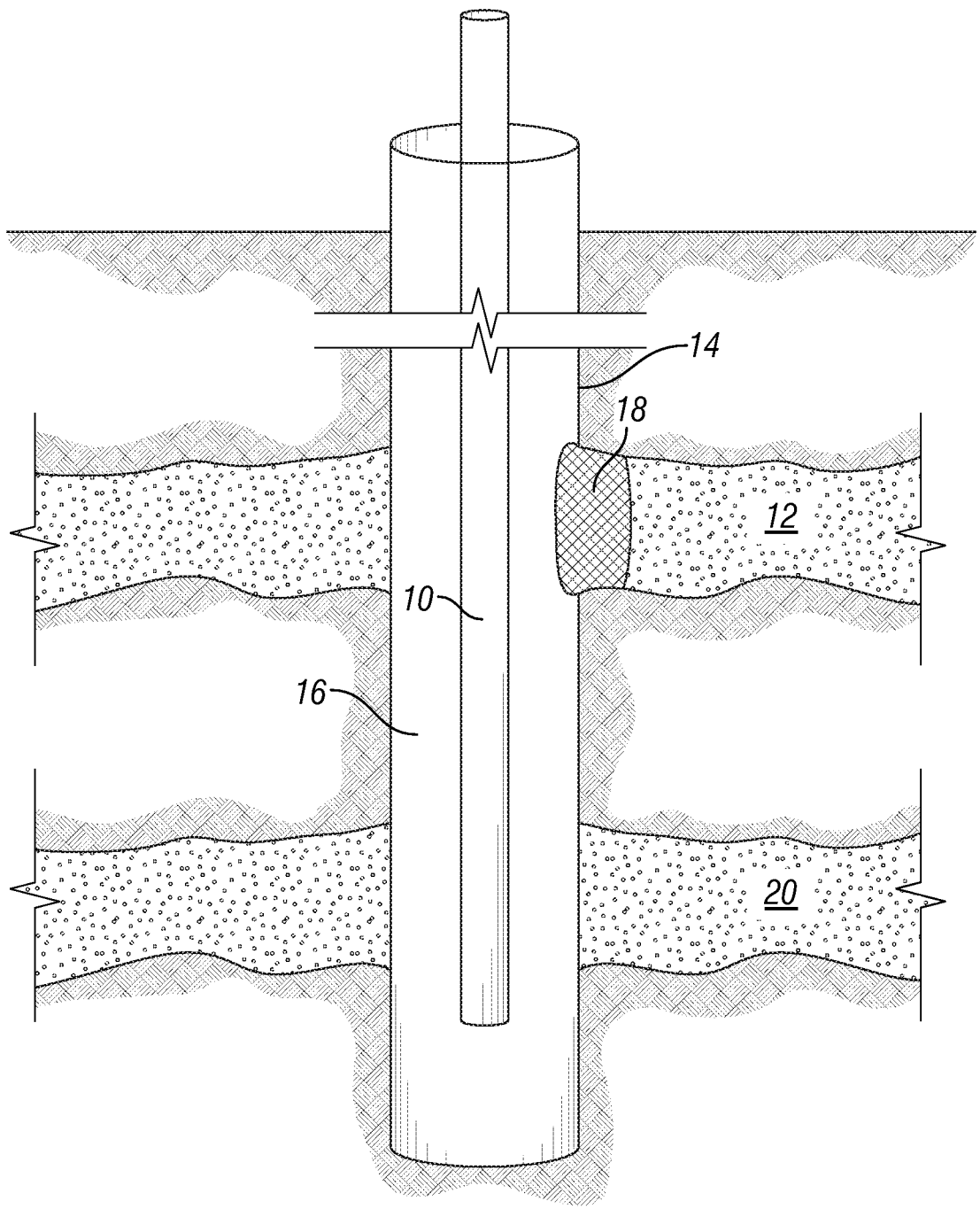
FIG. 3 schematically illustrates an embodiment of the present invention showing the tubular string positioned below the subsequent target zone following circulating-slurry plugging of the previously treated zone in either of FIG. 1 or 2.

Alternatively or additionally as shown in FIG. 2, the slurry can be pumped down through the annulus 16 in contact with the interval 12 and returned via the inner tubing 10.

With reference to either FIG. 1 or FIG. 2, in an embodiment of the invention, sometime before the diverting slurry has been circulated past the interval 12 to be diverted from, i.e., in advance of the slurry circulation at the interval 12, the pressure in the well bore 14 can be raised above the injection pressure of the interval 12 at the interval itself. The pressure increase may be achieved by: 1) increasing the flow rate of the diverting slurry and thus the friction pressure of the return flow slurry; 2) restricting the flow at the surface or down hole with a valve or choke apparatus (not shown) on the return flow stream; or 3) pumping a heavier weighted fluid ahead of the diverting slurry to increase the hydrostatic pressure of the return stream. Ideally, the pressure restriction is not performed against the diverting slurry. The above described methodology improves known practices by eliminating bridging in the wellbore or at an unwanted spot that could cause pipe sticking.

The ratio of the flow of diverting slurry that is injected into the interval may start off at 100% into the interval before bridging starts to occur. Once there is evidence of the beginning of diversion or bridging, then the ratio of return slurry can be increased to prevent wellbore sticking or plugging. If one is unsure of the ability of the interval to take the diverting slurry before bridging, then the initial return rate could be set to 100% and this would be lowered as the interval accepted the slurry fluid. An intermediate or split initial return rate can also be used in an embodiment, but the proportions of slurry volume injected into the interval and into the return line should total 100%, i.e. no slurry should be lost in the wellbore. Evidence of bridging can include, for example, higher injection pressure at the same or lower rates and pressures above the injection pressure. The pressure can be measured from the inner tubing or from the surface pressures on the annulus or inner tubing. Evidence may also be see in temperature measurements, RA tagging and measurement of microseismic events.

More than one interval can be diverted from at a time provided the inner tubing is below the first interval. Multiple intervals can also be diverted from at different times or treatments.

Figure 4:
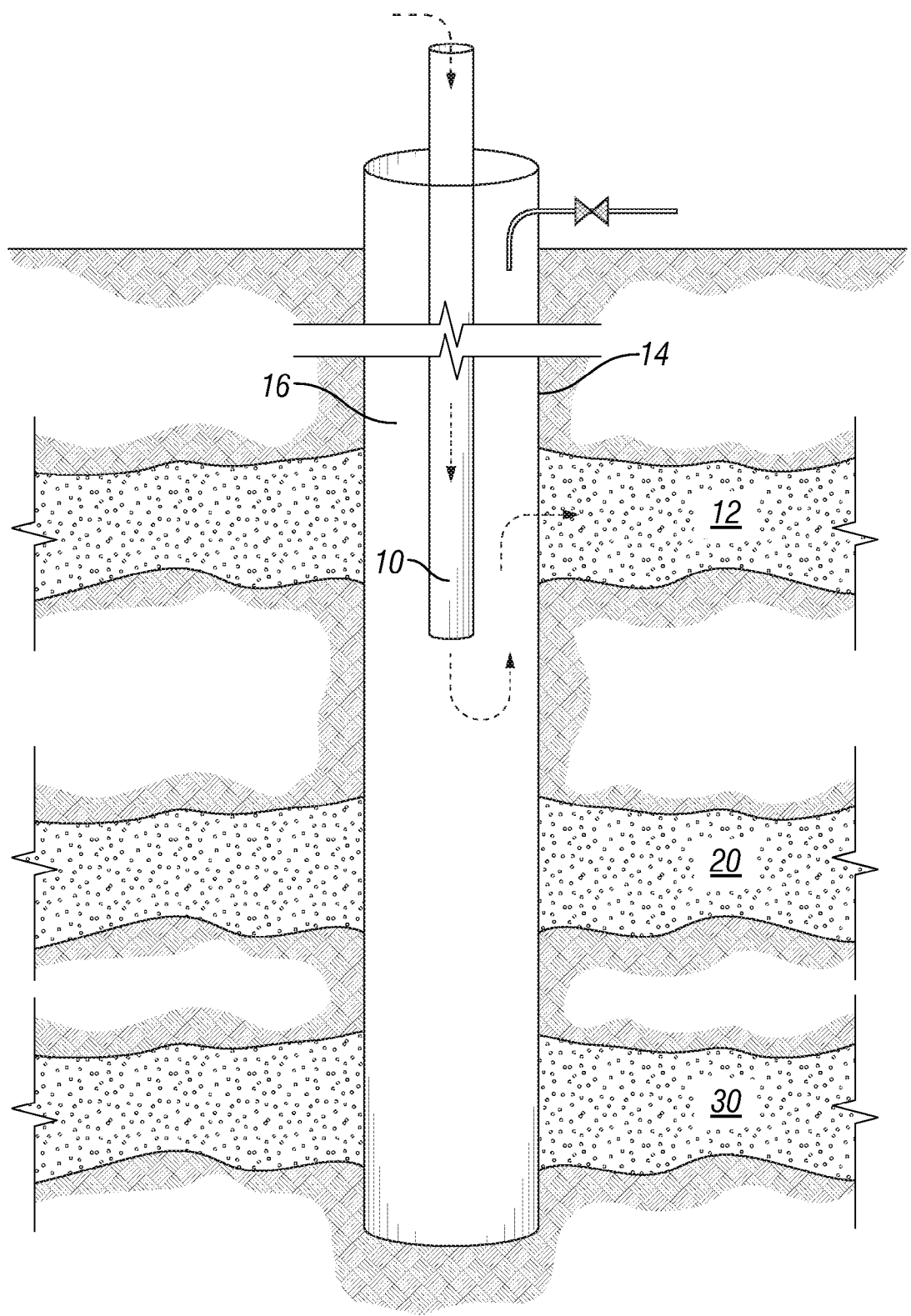
FIG. 4 (with FIGS. 5-8) schematically illustrates an embodiment of a multi-zone treatment method according to the present invention showing the initial step of treating the first formation wherein the treatment fluid is injected through a tubular string and the annulus is closed.

FIGS. 4 through 8 illustrate an exemplary sequence of events in one embodiment of a multiple interval treatment according to the present invention. In FIG. 4, the first formation 12 is treated by injecting the treatment fluid down the tubular string 10 which is lowered to adjacent the first formation 12. The annulus 16 is shut in to force the treatment fluid into the formation 12 and/or to form a and propagate a fracture.

Figure 5:
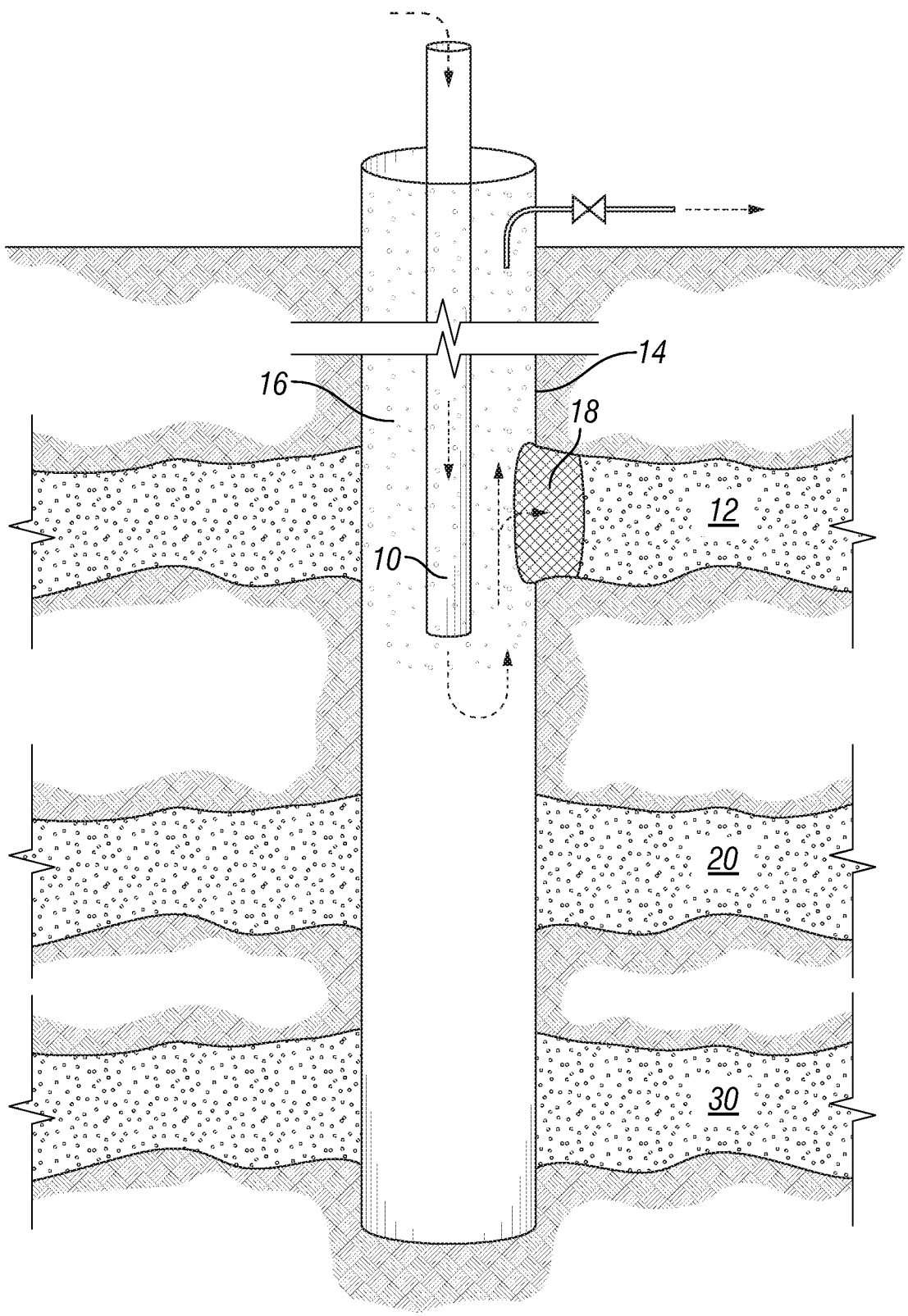
FIG. 5 schematically illustrates the multi-zone treatment method of FIG. 4 showing the step of plugging the first formation with slurry circulated past the first formation and transfer of the excess slurry into the annulus.

In FIG. 5, the treatment fluid is followed by the plugging slurry which is similarly injected down the tubular string 10 and circulated past the first formation 12 to form the plug 18. The annulus 16 is open for excess slurry return fluid flow to the surface, while maintaining sufficient pressure in the wellbore 14 to prevent fluid from entering from the formation 18, i.e. a positive pressure is maintained in the wellbore to inhibit premature fluid production from the formation 18 while subsequent treatments are effected. The excess slurry is transferred into the annulus 16, and can be followed with a solid-free flush to clear the tubing 10. In an embodiment, the slurry displaces solid-free fluid from the annulus 16, but the flush only has sufficient volume to clear the tubing 10, leaving the excess slurry stored in the annulus 16.

Figure 6:
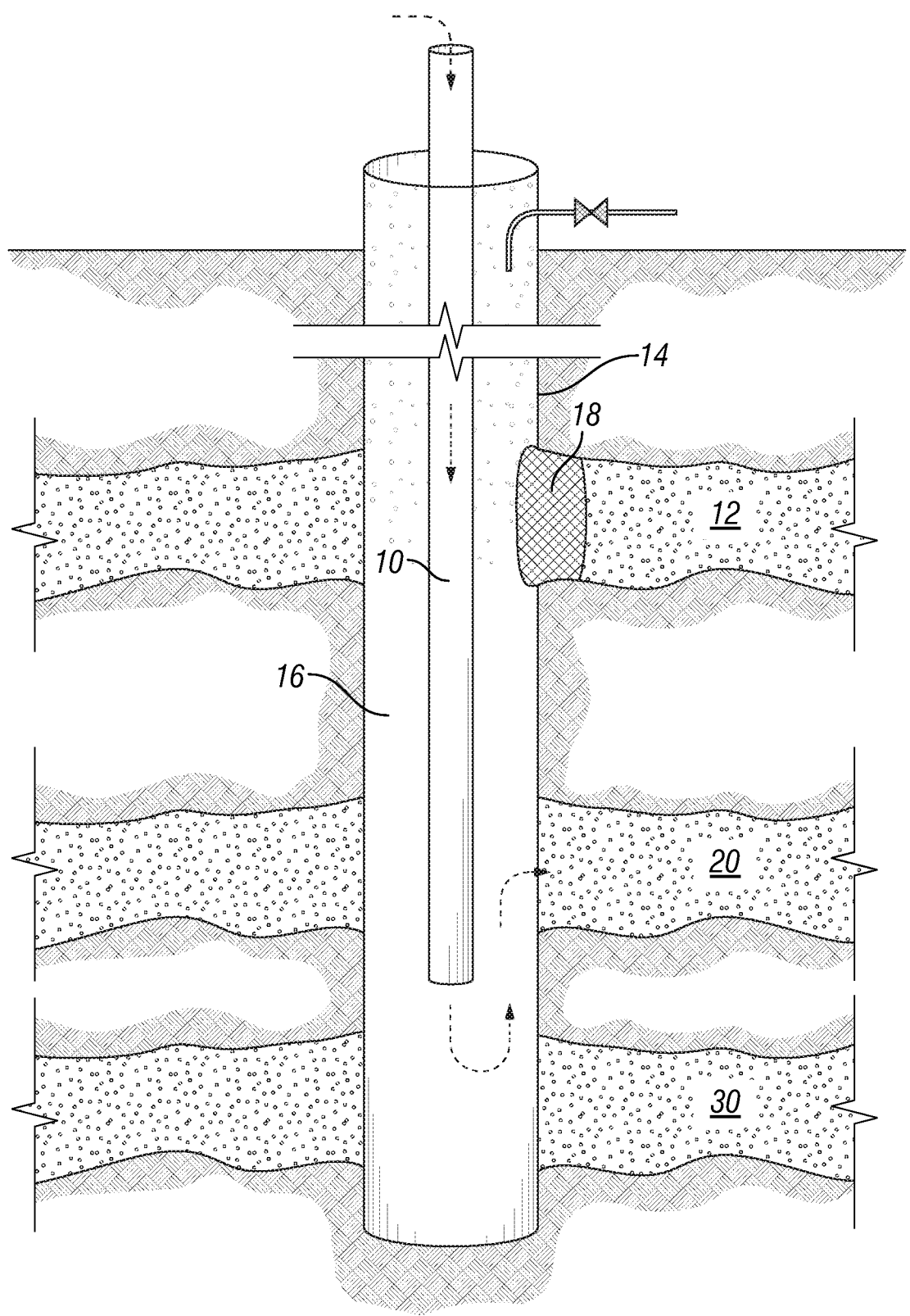
FIG. 6 schematically illustrates the multi-zone treatment method of FIGS. 4-5 showing the step of treating the second formation through the tubular string while the excess slurry is retained in the annulus.
Figure 7:
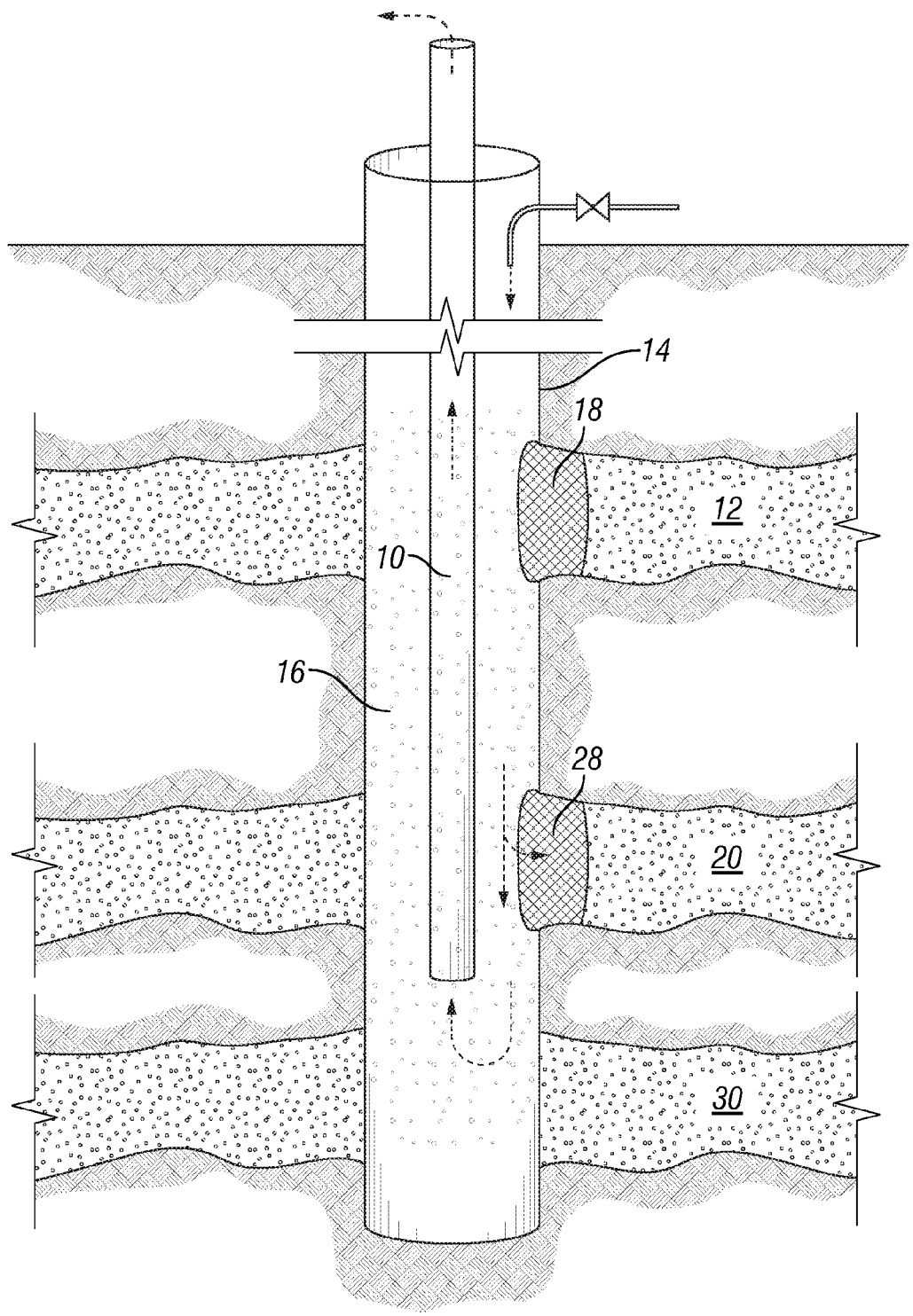
FIG. 7 schematically illustrates the multi-zone treatment method of FIGS. 4-6 showing the step of plugging the second formation by reversing the flow direction to circulate the slurry retained in the annulus into the tubular string.

In FIG. 6, following the placement of the plug 18 in FIG. 5, the tubing string 10 is lowered so that it is below the second formation 20, and treatment fluid is again injected to treat the formation. The annulus 16 is closed to direct substantially all of the treatment fluid into the formation 20, while the excess slurry from the previous placement of plug 18 is stored or retained in the dead space in the annulus 16. Following injection of the treatment fluid, the flow direction is reversed as shown in FIG. 7 so that the slurry previously stored in the annulus 16 is displaced to flow back down past the just-treated formation 20 and deposit the plug 28 to seal the formation. Tubing string 10 can be opened to allow a fluid flow back equal to any excess slurry circulated past the formation 20. Following displacement by a flush or additional slurry introduced into the top of the annulus 16, any excess slurry can now be stored in the tubing string 10 in preparation for plugging the next formation to be treated.

Figure 8:
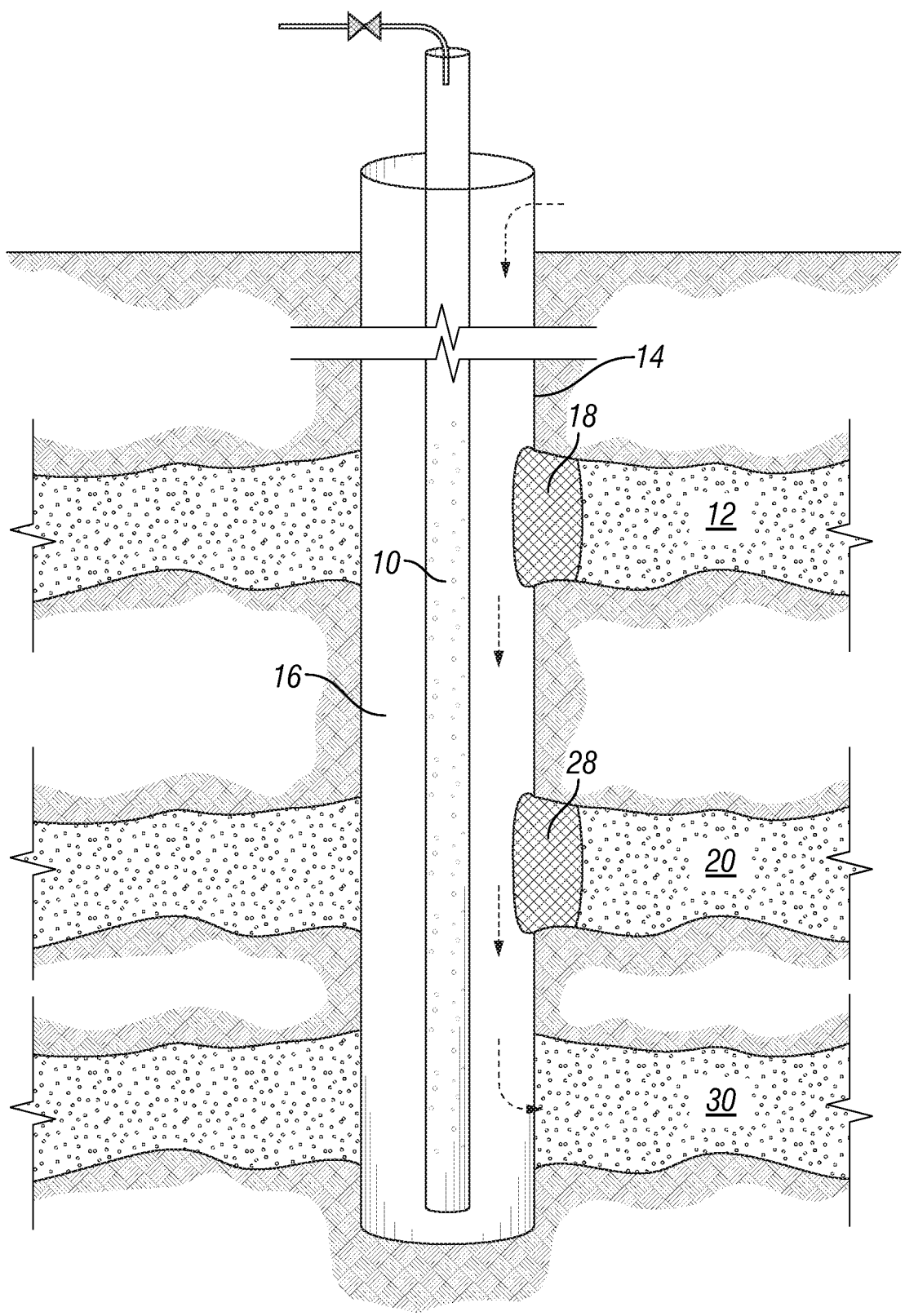
FIG. 8 schematically illustrates the multi-zone treatment method of FIGS. 4-7 showing the step of treating the third formation through the annulus while the excess slurry is retained in the tubular string.

The tubing string 10 holding the excess slurry is then lowered to near the next formation to be treated, third formation 30, as shown in FIG. 8. The tubing string 10 is shut in while the treatment fluid is injected at the top of the annulus 16 and into the third formation 30. In this manner, by repeating the steps of injecting the treatment fluid in one flow passage, reversing the flow direction for circulating the slurry to plug the formation from the other flow passage, storing the excess slurry in one of the annulus or the tubing string while repositioning the tubing string for the next treatment zone, any number of formations can be treated in any desired order. The plugging slurry is kept out of the treatment zone until the treatment is complete, or introduced as an end stage of the treatment. The tubing string can be left in the wellbore and multiple zones treated without tripping the equipment back in and out of the wellbore.

The diverting slurry can be made up of materials commonly used in well stimulation and/or lost circulation techniques. These are often viscous polymer or VES fluids that bridge via high viscosity going into the formation. Solids maybe used to bridge open cracks. These can be fibers, sand, calcium carbonate or other materials found in the industry. Those materials circulated out may be reused in the diversion process.

In one embodiment, the degradable materials may be in any shape: for example, powder, particulates, beads, chips, or fibers. Preferred embodiments may use these materials in the form of fibers. The fibers may have a length of about 2 to about 25 mm, preferably about 3 to about 18 mm. Typically, the fibers have a linear mass density of about 0.111 dtex to about 22.2 dtex (about 0.1 to about 20 denier), preferably about 0.167 to about 6.67 dtex (about 0.15 to about 6 denier). The fibers preferably degrade in one embodiment under downhole conditions, which may include temperatures as high as 180° C. (about 350° F.) or more and pressures as high as 137.9 MPa (20,000 psi) or more, in a duration that is suitable for the selected operation, from a minimum duration of 0.5, 1, 2 or 3 hours up to a maximum of 72, 48, 24, 12, 10, 8 or 6 hours, or a range from any minimum duration to any maximum duration. Although it is normally not necessary, the degradation may be assisted or accelerated by a wash containing an appropriate dissolver or one that changes the pH and/or salinity or hydrocarbon solvents. The degradation may also be assisted by an increase in temperature, for example when the treatment is performed before steam flooding. Herein, when we use the term degradable, we include all of these suitably dissolvable materials.

The degradable materials may be sensitive to the environment, so there may be dilution and precipitation issues. The degradable material used as a sealer preferably should survive in the formation or wellbore for a sufficiently long duration to accomplish pumping, for example, a minimum of 2 hours. The duration should further be long enough to perforate (if needed) the next pay zone, subsequent fracturing treatment(s) to be completed, etc. The degradable material may be sufficiently durable to last as long as 2 weeks, for example, to complete extended well work in one embodiment.

It must also be considered that degradable material sealers can inhibit flowback, and as a Various degradable materials are used with embodiments of the invention. Such materials could theoretically include inorganic fibers, for example of limestone or glass, but are preferably polymers or co-polymers of monomer-derived units such as esters, amides, or other similar materials. As used herein, polymers may be referred to in terms of either the monomers or the as-reacted form of the monomers, and it is understood that reference to the monomer is construed in the specification and claims as to the polymerized form of the derivative resulting from the polymerization of the monomer.

The degradable polymers may be partially hydrolyzed at non-backbone locations. Polymers or co-polymers of amides, for example, may include polyacrylamides, polyamides such as Nylon 6,6; Nylon 6; KEVLAR, and others.

Materials that dissolve at the appropriate time under the encountered conditions are also used, for example polyols containing three or more hydroxyl groups.

In one embodiment, lifetimes of fiber plugs made of polylactic acids (PLA) can be controlled by selecting the appropriate molecular weights. The higher molecular weight fiber plugs generally have longer lifetimes. For example, the plug having a polymer with a molecular weight of about 80,000 may have a lifetime of several hours, while plugs made of higher molecular weight polymers have longer lifetimes (up to 60 hours).

Some embodiments of the invention use degradable fiber plugs as described above. In one embodiment, the slurry is essentially free of inert particles or non-degradable particles which may tend to render the plug non-degradable or excessively delay plug removal. Other embodiments of the invention use plugs that are formed of degradable fibers and another material, such as inert proppants (including sand), or degradable absorbents (such as polyacrylic acid-co-acrylamide). The inclusion of an absorbent material may help fill pores inside a plug and make it stronger. PLA fiber with proppant having a multimodal particle size distribution (PSD) can provide a suitable mix.

In accordance with some embodiments of the invention, degradable materials are used in combination with methods of increasing the solid content of a slurry using particle-size distribution technology. With a properly chosen multi-modal distribution of particle sizes, smaller particles fill the void spaces between larger ones, resulting in a slurry requiring less water. Typical distributions use two or three distinct particle size ranges. This provides a slurry with improved flow properties without dehydration and faster plugging times.

With this approach (i.e., multi-modal particle size distribution), various combinations of temporary perforation sealers can be achieved with excellent properties. Because degradable or dissolvable materials, such as a polylactic acid fiber, may be selected to be compatible with formation fluids and their downhole lifetimes can be easily varied (e.g., by adding delay agents to increase their lifetimes), this approach is very attractive in the CMAD technique.

One of ordinary skill in the art can appreciate that various acid fracturing methods may be used with embodiments of the invention, including methods of generating acid downhole (using an emulsified acid, encapsulated acid, or solid acid precursor). For example, U.S. Pat. No. 7,166,560 to Still discloses the use of solid acid precursors to provide controlled release of acid by hydrolysis or dissolution. The solid acid precursor may be lactide, glycolide, polylactic acid, polyglycolic acid, a copolymer of polyacetic acid and polyglycolic acid, a copolymer of glycolic acid with other hydroxyl-, carboxylic acid-, or hydroxycarboxylic acid-containing moieties, a copolymer of lactic acid with other hydroxyl-, carboxylic acid-, or hydroxycarboxylic acid -containing moieties, or mixture of the preceding. The solid acid may be mixed with a second solid that reacts with an acid to increase the rate of dissolution and hydrolysis of the solid acid precursor.

In accordance with embodiments of the invention, degradable materials are preferably compatible with different pH fracturing fluids and with brines that are used in the wellbore containing different concentrations of salts (such as sodium chloride NaCl, calcium chloride $CaCl_2$, sodium bromide NaBr, potassium chloride KCl, and others). The degradable materials should be compatible with temperature ranges as wide as possible. It is preferred that the degradable materials are compatible with temperatures greater than 0° C. (32° F.). Degradable materials may be compatible with weighted brines or completion fluids as well.

The use of surfactant based fluids is recommended because appropriate VES fluids can provide a high zero shear viscosity and more effective proppant and/or fiber placement, and cause less damage than polymer based fluids. Furthermore, when a VES fluid system is used to deliver the degradable material plug for diversion, and when a surfactant fluid system is also used for friction reduction in, for example, slickwater fracturing, then after the degradable material plug degradation, there is no polymer remaining in the system to cause damage such as might hinder fluid flow from the formation.

While the description herein uses hydraulic fracturing to illustrate embodiments of the invention, one of ordinary skill in the art would appreciate that methods of the invention may be used in traditional propped fracturing treatments independent of the method of viscosifying the fluid selected to provide the proppant and fiber carrying capacity. Polymer based or surfactant based fluid may be used and the methods and compositions of the invention may be used in other types of fracturing, including slickwater (or waterfrac) and acid fracturing.

The method of the invention can be used in single stage or multiple stage treatments such as, by non-limiting examples: fracturing, matrix treatments, squeeze treatments, and water control treatments. The use of circulated fiber diversion in any fluid may impact a wide range of applications. While methods of the invention may be used in fracturing, workover, or other types of operations, for clarity, the following description will use hydraulic fracturing as an example to illustrate embodiments of the invention. Of course, other sequences are possible, depending upon the stress profile. One of ordinary skill in the art can appreciate that this is not intended to limit the scope of the invention to hydraulic fracturing. Instead, methods of the invention may also be used in other operations, such as temporary plugging of fractures.

Whereas sequential fracturing has usually started at the bottom of a vertical well, or the distal end of a horizontal well, and progresses towards the wellhead, with the use of the present CMAD method it is now possible to routinely fracture sequentially downward, i.e. starting at an upper zone and progressing to lower zones. In the downward sequence, for example, the fracturing fluid can be pumped down the annulus followed by the slurry of degradable plugging materials which can be circulated past the fracture and excess material removed via tubing to the surface. The circulation and return of excess material keeps the degradable material from plugging or bridging the wellbore below the lower end of the tubing. Once the fracture is plugged, the excess diverting slurry is circulated out of the wellbore via the tubing, the tubing lowered to adjacent or below the next zone to be fractured, and the sequence repeated.

Some embodiments of the invention relate to temporarily blocking of already-created fractures so that other zones may be fractured. As applied to multi-stage fracturing, at the tail end of a fracturing treatment, a degradable or dissolvable material can be circulated in the wellbore as described herein to temporarily plug a completed fracture. The temporary plug locks the proppants in a fracture, making them immobile and causing substantial stress increase and diversion in upper or lower zones by means of a significant net pressure increase due to the high likelihood of proppant bridging with the degradable materials. In accordance with an embodiment of the invention, it is not necessary to create a temporary packer or form a plug in the wellbore, and in one embodiment it is preferred to avoid the formation of a temporary packer or plug in the well bore below the completed fracture, for example by removing the excess slurry and maintaining sufficient and continuous flow rates to avoid particle settling within the well bore.

With this system, the fracture is protected and successive fracturing treatments, up and/or down the hole, can be performed without the need for lengthy wireline intervention, as only perforation is required to initiate a subsequent fracturing treatment. The degradable material will dissolve with time and unplug the fracture. These methods may be performed with any suitable equipment known in the art, including coiled tubing (CT) that has been installed in the wells for jetting new perforations. If desired, a perforating gun or jetting tool can be carried on the tubing in conjunction with a fluid inlet or outlet valve that can be selectively operated for the slurry circulation and/or treatment fluid supply. These methods of the invention are similar to the ISDT's that are currently used on land in North America. However, the circulated degradable material assisted diversion (CMAD), in accordance with embodiments of the invention, can provide much higher and more reliable stress diversion without plugging the wellbore, and can proceed up or down the wellbore.

Embodiments of the invention can provide diversion methods that are more reliable than conventional ISD by adding degradable materials to enhance the net stress of the pay zone that was just fractured. In accordance with embodiments of the invention, to achieve a greater net pressure in the first fracture, high concentrations of special degradable materials can be used at the tail ends of fracturing treatments. The degradable materials may be fibers, powders, or any other forms. At high concentrations of fibers, the proppant-fiber slurry can bridge in the fracture. As a result, the job may screen out. This will lead to a significant increase in the net pressure and to good near-wellbore proppant placement. Such a procedure may be called a "tail screenout." Fiber bridging is a complicated phenomenon, which requires special modeling to design such a job properly. U.S. Pat. No. 6,837,309 to Boney discloses methods and compositions designed to cause tip screenouts.

High degradable material concentrations at the tail end of a treatment may also be used in embodiments to: (a) sustain proppants, i.e. to reduce settling rate during and after treatments and to reduce proppant flowback; and (b) ensure larger net surcharge pressure in the preceding stages.

Furthermore, appropriate designing and laboratory experiments known to those skilled in the art can be used in an embodiment to ensure that the CMAD techniques in accordance with embodiments of the invention work properly. In addition to design and laboratory experiments, modeling may also be used to design proper parameters for CMAD. Various formation modeling techniques are available for hydraulic fracturing, such as Schlumberger's FracCADE stimulator™ and the methods disclosed in U.S. Pat. No. 6,876,959. Other available software, for example, includes pseudo three-dimensional (P3D) hydraulic fracture simulators and planar three-dimensional (PL3D) hydraulic simulators (including GOHFER™ from Stim-Lab and Marathon Oil Co.). Embodiments of the invention are not limited to any particular modeling method.

In accordance with some embodiments of the invention, modeling is used to simulate induced stress diversion for the formation of interest. Then, the types and amounts of fluids to be used, and the durations and pumping rates for the fracturing job, including the slurry circulation, are accordingly selected. Embodiments of the invention provide efficient methods for diverting stress/pressures for staged fracturing. One of ordinary skill in the art would appreciate that these methods may be applied in any type of well, including vertical, deviated or horizontal wells, and open or cased hole.

Good knowledge of formation and reservoir fluid properties is important to employ the CMAD techniques appropriately for multiple fracturing treatments. The following parameters are important ones to consider in optimizing a CMAD job: in-situ stress profile; in-situ stress differential between pay sand and shales; reservoir fluid composition and its compatibility with degradable material; and proppant sustaining in the fracture. Some of these parameters may be available from downhole measurements, while others may not be available. As noted above, embodiments of the invention may use a modeling technique to optimize the CMAD job. Any parameters not available may be optimized using a suitable modeling method known in the art.

As illustrated in the above description, embodiments of the invention use circulated degradable materials to block a zone, perforation or fracture temporarily so that work may be performed in other zones. In accordance with some embodiments of the invention, at the tail end of a fracturing treatment, a degradable material is pumped at a high concentration to temporarily plug a completed fracture, and to lock the proppant in a fracture making it immobile and causing substantial stress increase and diversion from lower zones by means of a significant net pressure increase due to a higher likelihood of proppant bridging. With this system, the fracture is protected and a subsequent fracturing treatment further up or down the hole may be performed without the need for lengthy wireline intervention, as only perforation is required to initiate a subsequent treatment.

As noted above, methods of the invention that form temporary bridges or seals in the perforations, fracture(s), formation, or any combination of these are used for subsequent fracturing or for other operations to be performed downhole. In accordance with some embodiments of the invention, after the temporary seal is formed, the well may undergo various treatments instead of subsequent fracturing. For example, the wellbore may be repaired (acid treatments), or installation of an electric submersible pump (ESP) may be performed. The plugging agent can be selected to last sufficiently long to protect the formation over the expected time period of the subsequent downhole operation.

Therefore, in accordance with some embodiments of the invention, a fracture is temporarily sealed or blocked with a circulated degradable material. The circulated degradable material is used to temporarily protect the fracture from post-job workover fluid damage, or to temporarily protect downhole equipment from fracture flowback damage. The selection of the circulated degradable materials depends on the expected damage, bottomhole conditions, and the durations needed for protection.

The addition of the circulated degradable materials in accordance with embodiments of the invention may be practiced with existing equipment. One of ordinary skill in the art would appreciate that various methods used in the field may be adapted for use with methods of the invention. For example, the circulated degradable materials may be mixed with proppants in blenders or batch mixing tanks. The circulated degradable materials can mix with proppant or simply follow the proppant in the casing to cause the bridging.

The methods of the invention may also be combined with methods of using fibers to assist in the transport of proppant, for example in slickwater treatments, for example as described in U.S. Pat. No. 7,275,596. The methods may also be used in treatments in which fibers are also used in proppant-free fluids such as in the pads of fracturing treatments, or in prevention of fluid loss into natural fractures, for example as described in US 2006-0042797. Preferably, the same fiber is used in all stages of these combination treatments. As an example, the same degradable fiber is used in the pad of a fracturing treatment stage, and/or in the main fracturing fluid of the stage to assist proppant transport, and at the end of the stage for circulated degradable material assisted diversion.

All references identified herein, including any priority documents, are hereby incorporated herein by reference to the extent not inconsistent with the present invention, and for all jurisdictions where such incorporation by reference is permitted.

Those skilled in the art will recognize that many combinations of stimulation and diversion apparatuses and methodologies not specifically mentioned in the examples will be equivalent in function for the purposes of this invention. The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of well treatment comprising:
   a) deploying a tubular string to a position at or below a target interval;
   b) treating the target interval; and,
   c) circulating a diverting slurry comprising a solids volume fraction of from about 0.05 to about 0.56 past the target interval to form a temporary plug containing an insoluble degradable material at the target interval.

2. The method of claim 1, wherein the tubular string is coiled tubing.

3. The method of claim 1, wherein the tubular string is jointed pipe.

4. The method of claim 1, wherein the treating comprises fracturing or acidizing.

5. The method of claim 1, further comprising:
   increasing fluid pressure in the wellbore at a time before the diverting slurry has been circulated past the target interval.

6. The method of claim 5, wherein the step of increasing the pressure comprises increasing a flow rate of the diverting slurry to increase friction pressure of a return flow slurry.

7. The method of claim 5, wherein the step of increasing the pressure comprises restricting fluid flow at the surface or down hole with a valve or choke apparatus on a return flow stream.

8. The method of claim 5, wherein the step of increasing the pressure comprises pumping a heavier weighted fluid ahead of the diverting slurry to increase hydrostatic pressure of a return stream.

9. The method of claim 1, wherein a plurality of intervals are diverted.

10. A method of well treatment, comprising:
    a) injecting a slurry into a completed well bore penetrating a formation, wherein a solids phase of the slurry comprises an insoluble degradable material;
    b) circulating the slurry through at least a portion of the well bore in contact with a surface comprising one or more openings in fluid communication with a first permeable formation;
    c) consolidating the degradable material to form a plug of the degradable material in the one or more openings to block fluid communication between the well bore and the first permeable formation, wherein a flow of the slurry is maintained in the well bore during the circulation and consolidating steps to inhibit gravitational settling of the solids and bridging in the wellbore;
    d) performing a downhole operation in the well while the degradable material assists diversion from the plugged first permeable formation, wherein the downhole operation is selected from the group consisting of hydraulic fracturing, acidizing, well repair, installation of downhole equipment, and combinations thereof, wherein any of the degradable material unused in the plug is kept clear from the downhole operation; and, e) degrading the consolidated degradable material to remove the plug and restore fluid communication with the first permeable formation.

11. The method of claim 10, wherein the degradable material is present in the slurry at a concentration of at least 1.2 g/L (10 lbm/1,000 gal).

12. The method of claim 10, wherein the consolidation comprises inducing a screenout of the solids phase.

13. The method of claim 10, wherein a volume fraction of the solids phase of the slurry comprises from 0.05 to 0.56 of the slurry volume.

14. The method of claim 10, wherein the solids phase includes fiber.

15. The method of claim 10 wherein the solids phase comprises a mixture of a fiber and a particulate material, wherein at least one of the fiber and particulate material is degradable.

16. A circulated degradable material assisted diversion (CMAD) fracturing method, comprising the sequential steps of:

(a) injecting well treatment fluid into a well penetrating a multilayer formation to propagate a hydraulic fracture in a layer of the formation, wherein the well comprises first and second isolated passageways;

(b) circulating an aqueous slurry past the fracture, wherein the slurry comprises fibers of an insoluble, degradable material in a solids phase to form a plug of the consolidated fibers and isolate the hydraulic fracture from the wellbore, wherein the degradable material is present in the slurry at a concentration of at least 1.2 g/L (10 lbm/1,000 gal), and wherein a fluid phase of the slurry comprises a viscoelastic surfactant, a co-surfactant, a rheology modifier, a polymer friction reducer, a surfactant friction reducer, a polymeric drag reduction enhancer, a monomeric drag reduction enhancer, an aqueous brine, or a combination or mixture thereof;

(c) transferring excess slurry from the plug in step (b) to one of the first and second passageways;

(d) with the plug diverting from the previous hydraulic fracture and while isolating the excess slurry in one of the first and second passageways, injecting well treatment fluid into the other one of the first and second passageways to propagate a subsequent hydraulic fracture in another layer of the formation; and, (e) thereafter degrading the degradable material to remove the plug.

17. The CMAD fracturing method of claim 16 wherein the first passageway comprises a tubular and the second passageway comprises an annulus between the tubular and a wellbore.

18. The CMAD fracturing method of claim 17, further comprising sequentially repeating steps (b), (c) and (d) one or more times with an alternated slurry flow direction and alternated first and second passageways between excess slurry isolation and treatment fluid injection.

19. The CMAD fracturing method of claim 16, further comprising sequentially repeating steps (b), (c) and (d) one or a plurality of times for diversion from the previous hydraulic fractures and propagation of subsequent hydraulic fracture(s) in other layer(s), wherein the plugs are thereafter removed in step (e) by degrading the degradable material.

20. The CMAD fracturing method of claim 16, further comprising the step of perforation in advance of the fracture propagation in steps (a) and (d).

21. The CMAD fracturing method of claim 16, wherein the slurry circulation comprises a terminal portion of a tail stage of the hydraulic fracturing.

22. The CMAD fracturing method of claim 16, comprising maintaining a pressure in the wellbore adjacent the plug that is above the formation pressure of the hydraulic fracture isolated from the wellbore in step (b).

* * * * *